United States Patent [19]

Djupsjobacka

[11] Patent Number: 5,619,607
[45] Date of Patent: Apr. 8, 1997

[54] DEVICE FOR VELOCITY MATCHING BETWEEN ELECTRICAL AND OPTICAL SIGNALS IN A WAVE GUIDE STRUCTURE

[75] Inventor: Anders G. Djupsjobacka, Solna, Sweden

[73] Assignee: Telefonaktiebolaget LM Ericsson, Stockholm, Sweden

[21] Appl. No.: 546,843

[22] Filed: Oct. 23, 1995

Related U.S. Application Data

[63] Continuation of Ser. No. 106,919, Aug. 16, 1993, abandoned.

[30] Foreign Application Priority Data

Aug. 17, 1992 [SE] Sweden .............................. 9202355-5

[51] Int. Cl.$^6$ ........................................ G02B 6/10
[52] U.S. Cl. .................................... 385/129; 385/147
[58] Field of Search ............................... 385/1–3, 8–10, 385/16, 129, 147; 359/251, 254

[56] References Cited

U.S. PATENT DOCUMENTS

| | | | |
|---|---|---|---|
| 4,005,927 | 2/1977 | Caton | 385/16 |
| 4,251,130 | 2/1981 | Marcatili | 385/9 |
| 4,448,479 | 5/1984 | Alferness | 385/3 |
| 4,468,086 | 8/1984 | Liu | 385/9 |
| 4,928,076 | 5/1990 | Mourou et al. | 385/2 |
| 5,004,313 | 4/1991 | Tan et al. | 385/2 |
| 5,005,932 | 4/1991 | Schaffner et al. | 385/3 |
| 5,061,030 | 10/1991 | Miyamoto et al. | 385/3 |
| 5,076,655 | 12/1991 | Bridges | 385/3 |
| 5,138,480 | 8/1992 | Dolfi et al. | 385/2 |
| 5,161,206 | 11/1992 | Djupsjöbacka | 385/2 |

FOREIGN PATENT DOCUMENTS

| | | |
|---|---|---|
| 152996 | 8/1985 | European Pat. Off. . |
| 0152996 | 8/1985 | European Pat. Off. ................ 385/1 |

OTHER PUBLICATIONS

Patent Abstract of Japan, vol. 13, nr. 566, JP 1–237517 (Sep. 22, 1989).
Patent Abstract of Japan, vol. 13, nr. 554, JP 1–232323 (Sep. 18, 1989).
Patent Abstract of Japan, vol. 13, nr. 533, JP 1–219819 (Sep. 1, 1989).
R. C. Alferness et al., "Velocity–Matching Techniques for Integrated Optic Traveling Wave Switch/Modulators", *IEEE J. of Quantum Electronics* vol. QE–20, No. 3, pp. 301–309 (1984).
A. Djupsjöbacka, "Novel Type of Baseband Phase–Reversal Electrode for Optical Modulators with Linear Phase Response", *Electron. Lett.* vol. 26, No. 5, pp. 318–320 (1990).
D. W. Dolphi et al., "40 GHz Electro–Optic Modulator with 7.5 V Drive Voltage", *Electron. Lett.* vol. 24, No. 9, pp. 528–529 (1988).
K. Kawano et al., "New Travelling–Wave Electrode Mach–Zehnder Optical Modulator with 20 GHz Bandwidth and 4.7 V Driving Voltage at 1.52 um Wavelength", *Electron. Lett.*, vol. 25, No. 20, pp. 1382–1383 (1989).
H. Y. Lee et al., "Crosstie Overlay Slow–Wave Structure for Broadband Traveling–WaveType Electro–Optical Modulators", *International J. of Infrared and Mullimiter Waves* vol. 9, No. 1, pp. 87–99 (1988).
P. L. Liu, "Recent Development in High Speed Integrated Optical Gates", *J. of Optical Communications* vol. 2, No. 1, pp. 2–6 (1981).

(List continued on next page.)

*Primary Examiner*—Akm E. Ullah
*Attorney, Agent, or Firm*—Burns, Doane, Swecker & Mathis, L.L.P.

[57] ABSTRACT

The present invention relates to a device for velocity matching between optical and electrical signals in a waveguide structure comprising first waveguiding means for optical signals and second waveguiding means for electrical signals. The cross-section of the waveguide structure varies dielectrically in the direction of the propagation.

4 Claims, 3 Drawing Sheets

OTHER PUBLICATIONS

H. Miyamoto et al., "A Broad–Band Traveling–Wave Ti:LiNbO$_3$ Optical Phase Modulator", *Japanese J. of Appl. Physics* vol. 30, No. 3A, pp. 383–385 (1991).

H. Miyamoto et al., "A New Structure Broad–Band Traveling Wave Ti:LiNbO$_3$ Optical Phase Modulator", *Proc. IPR'91*, paper TuG3 (1991).

K. Nogushi et al., "A Ti:LiNbO$_3$ Optical Intensity Modulator with More Than 20 GHz Bandwidth and 5.2 V. Driving Voltage", *IEEE Photon. Technol. Lett.* vol. 3, No. 4, pp. 333–335 (1991).

H. Otha et al., "Ti:LiNbO$_3$ Mach–Zehnder Modulator Using a Buried Traveling Wave Electrode" *Proc. OFC '92*, paper ThG3 (1991).

M. Seino et al., "33 GHz–cm Broadband Ti:LiNbO$_3$ Mach–Zehnder Modulator" *Proc. ECOC '89*, paper ThB22-5 (1989).

"Velocity–Matching Tech. for Integrated Optic Traveling Wave Switch/Modulators" By Alferness et al, IEEE J. of Quantum Electronics vol. QE–20, No. 3 pp. 301–309, 1984.

DEVICE FOR VELOCITY MATCHING BETWEEN ELECTRICAL AND OPTICAL SIGNALS IN A WAVE GUIDE STRUCTURE

This application is a continuation of application Ser. No. 08/106,919, filed Aug. 16, 1993 now abandoned.

BACKGROUND

The present invention relates to a device for velocity matching between optical and electrical signals in a waveguide structure comprising first waveguiding means for optical signals and second waveguiding means for electrical signals.

It is a problem with electro-optical devices based on waveguiding structures (Travelling Wave structures) that the band-width is limited by so called walk-off, i.e. an electrical signal and an optical signal propagate with different velocities or group velocities. In the case of a modulator modulating and modulated signals thus propagate with different velocities.

For example, in fast digital fibre-optical systems, particularly with bit velocities of more than 2,5 Gbit/s, it is important to limit walk-off. In order to reach these high bit velocities with optical signals fast optical modulators are required whereby either fast direct modulating lasers or fast electro-optical modulators can be used. The lasers are cheaper but are a qualitively inferior solution than the electro-optical modulators and with very high bit velocities, more than approximately 10 Gbit/s, it is today necessary to use electro-optical modulators.

Also in analog fibre-optical systems which e.g. may have a bandwidth of some GHz it is interesting to be able to reduce walk-off, which in such systems case above all gives rise to distortion.

Apart from waveguide losses walk-off is a limiting factor for a large group of waveguide modulators. Whereas waveguide losses is a physical phenomenon which above all is due to dimensions and resistivity of the waveguide, where the losses may be reduced by high fabricational requirements and high requirement as to the surface and bulk properties of the electrode (elimination of waveguide losses means in principle that superconducting electrodes are used), walk-off can be seen as a design problem. E.g for $LiNbO_3$-modulators walk-off means that the group velocity of the modulating, electrical signal is less than the group velocity of the modulated, optical signal.

A number of solutions have been suggested to reduce or minimize walk-off or to match the velocity between optical and electrical signals. Therethrough the so called V/GHz-quotient can be lowered. Solutions have also been suggested to minimize the V/GHz-quotient, among others walk-off has been used in order to increase the bandwidth and furthermore the electrical and optical field pattern have been adapted to each other to reduce the switching voltage.

EP-A-0 152 996 describes a device for matching the velocity between an optical and an electrical signal with a thick and etched buffer layer which is invariant in the direction of propagation. Therethrough a certain velocity matching and an increased bandwidth is achieved, but this particularly at the cost of a too high feeding voltage.

In U.S. Pat. No. 4,468,086 velocity matching is simulated between an electrical and an optical signal through the electrical signal path being so formed that interaction between the two waves occurs along selected regions of the path of propagation of the electrical signal; the matching is simulated through a phase delay. Particularly the electrical path is bent away from the optical path at uniformly spaced intervals in order to create areas where no interaction occurs. Therethrough optical waves are modulated by the electro-optical effect.

Through U.S. Pat. No. 4,448,479 the walk-off effect is to be minimized through exposing, at uniformly spaced intervals, the electro-optical induced TE-TM-coupling coefficient to a phase shift of 180°, also in this case is thus a velocity matching simulated, in this case through phase reversal. In as well U.S. Pat. No. 4,468,086 as U.S. Pat. No. 4,448,479 the velocity matching can be used to make the structure "resonant" and therethrough the bandwidth can be increased, but at the same time, with a great probability, the phase response of the modulator will be destroyed, wherethrough it cannot be used for digital communication.

Particularly with $LiNbO_3$-modulators, essentially generally with a lowering of walk-off, a part of the modulating (electrical) signal is led in $LiNbO_3$ and may propagate in a different material which has a lower dielectric constant and in this way the group velocity of the electrical signal is increased. $LiNbO_3$ has dielectric constants of 28 and 43 respectively in different directions (the material is anisotropic); in certain models however the material is treated as isotropic and then the geometrical average of 34,7 is used. The square root of the dielectric constant is to be compared with the refractive index of $LiNbO_3$ which is about 2,2; thus the difference in group velocity between the electrical and the optical signal is great. For coplanar waveguides the group velocity of the electrical signal is not less than $c/4,2$ and a number of devices are known of which the group velocity is increased by use of thick electrodes, thick buffer layers and with etched buffer layer of e.g. $SiO_2$. Further devices comprise a "parallel" waveguide of $SiO_2$ or air as dielectricum wherein also the "parallel" waveguide may comprise a groundplane of its own. Generally a considerably increased feeding voltage is required with known solutions in order to obtain an increased bandwidth.

SUMMARY

An object of the present invention is to provide a device for matching the velocity of optical and electrical signals as initially stated in order to therethrough decrease or minimize walk-off and to increase the bandwidth. A further object is that the device should not require high voltages and furthermore be easy and cheap to fabricate. It is also the intention to be able to reduce the so called V/GHz-quotient. The invention has further as an object to provide a modulator based on a waveguide structure with increased bandwidth and which can particularly be used in fast digital fibre-optical system. It is furthermore an object of the invention to provide a modulator to be applied in analog fibre-optical systems.

These as well as other objects are achieved with a device with a waveguide structure the cross-section of which varies dielectrically in the direction of propagation.

Particularly the first waveguiding means comprises at least one optical waveguide and particularly the second waveguiding means comprises at least two electrodes of which one forms a signal electrode. The waveguide structure according to one embodiment comprises at least one buffer layer which is so arranged that the electrical field from the electrode extend into at least one of the buffer layers as well as to that/the optical guide or guides. According to a preferred embodiment the waveguide structure comprises a substrate, preferably LiNbO$_3$. In the case of LiNbO$_3$ the velocity matching preferably means that the velocity of the micro- wave should be increased, i.e. the group velocity of the electrical signal should be increased to increase the band- width. As an alternative to LiNbO$_3$ it possible to use e.g. LiTaO$_3$, KNbO$_3$. KTP, but also other electro-optical materials are possible. With earlier known devices for increasing the group velocity the structures have had a cross-section which has been invariant in the direction of propagation. According to the invention it is possible to use two or more different cross-sections which alternate periodically or aperiodically or in a random manner in the direction of propagation. A periodical cross-sectional variation may comprise a periodical grating wherein in particularly the grating constant is considerably smaller than the wave- length of the electrical signal. The variation in cross-section can be achieved through at least a first and a second material or medium which have different dielectric constants. Advantageously the variations in cross-section may be achieved through replacement of the material in the buffer layer by a different material with a lower dielectric constant or by removing material from the buffer layer. Thus the different sections with different cross-section may differ through the buffer layer by etching in the waveguide gap and under the signal electrode. Therethrough the capacitance per length unit of the electrical wave guide is reduced wherethrough the group velocity of the electrical signal is increased. According to a particular embodiment the electrode structure can be coplanar and/or comprise double ground planes.

Preferably, in order that the propagating electrical wave sees the waveguide as "invariant" in the direction of propagation, those sections with a first and a second cross-section respectively have to be much smaller than the wavelength of the highest frequency intended to be used in the device, particularly the modulator (the frequency of the modulating signal). This embodiment means a gratinglike construction wherein the grating constant is less than 1/20-the of the wavelength.

Naturally a number of different cross-sections can be used as well as instead of a periodical construction or a periodical grating the same effect can be achieved through randomly etched cavities or similar. Furthermore one of the materials should have a dielectric constant which is lower than those of the others, particularly when buffer material is removed this should be replaced by a different material which has lower dielectric constant, wherein the second material according to a particular embodiment may comprise air.

According to a preferred embodiment the device forms a modulator.

The device may advantageously be used in fast digital fibre-optical systems or in analog fibre optical systems with a bandwidth of some GHz.

DESCRIPTION OF THE DRAWINGS

The invention will in the following be further described under reference to the appended drawings in an explanatory and by no means limiting way wherein FIG. 1 schematically illustrates a waveguide structure with a periodical variation with two different sections seen from above.

DETAILED DESCRIPTION

Figure 1:
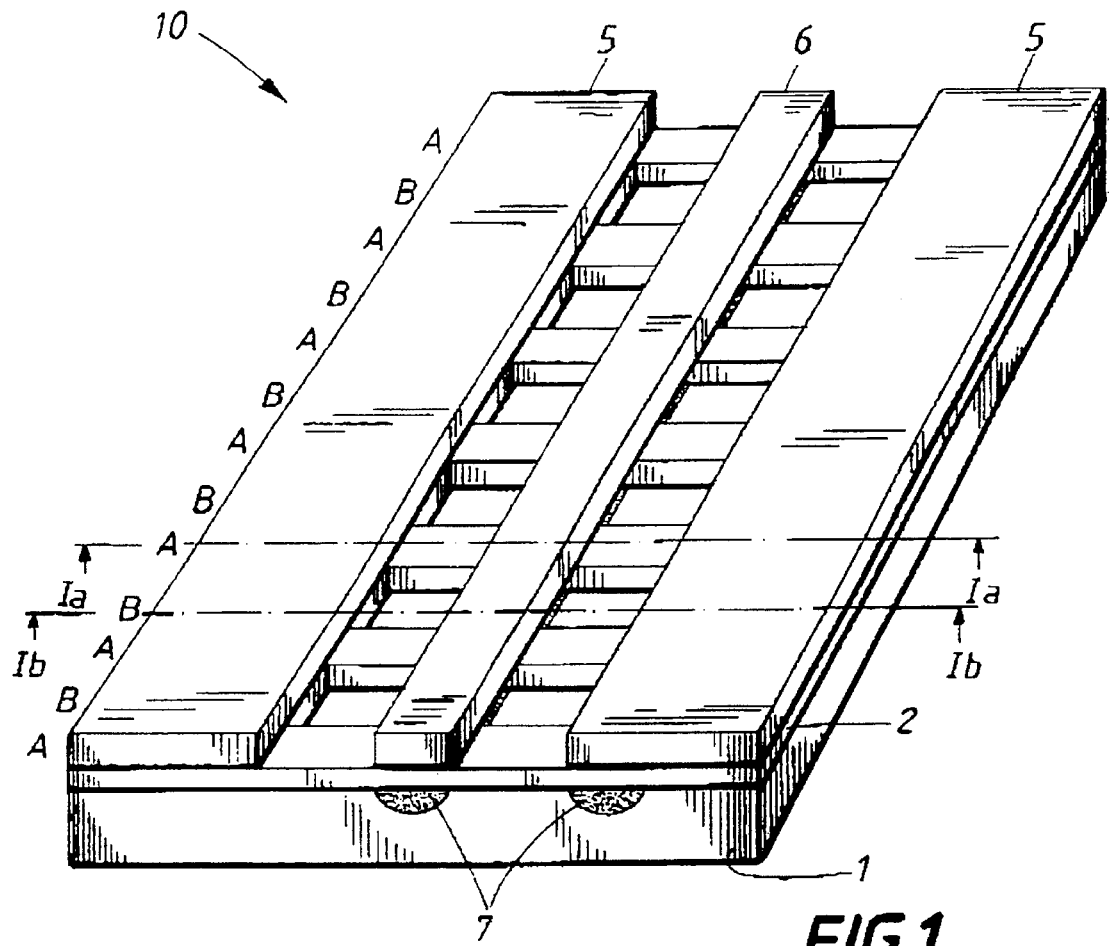
FIG. 1a is a cross-sectional view taken along lines Ia—Ia of FIG. 1, illustrating a first section.
FIG. 1b is a cross-sectional view taken along lines Ib—Ib of FIG. 1, illustrating a second section, FIG. 2 schematically illustrates a wave guiding structure with a periodical variation and with three different sections.
Figure 1A:
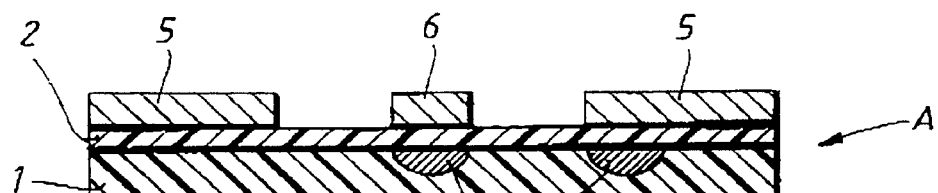
Figure 1B:
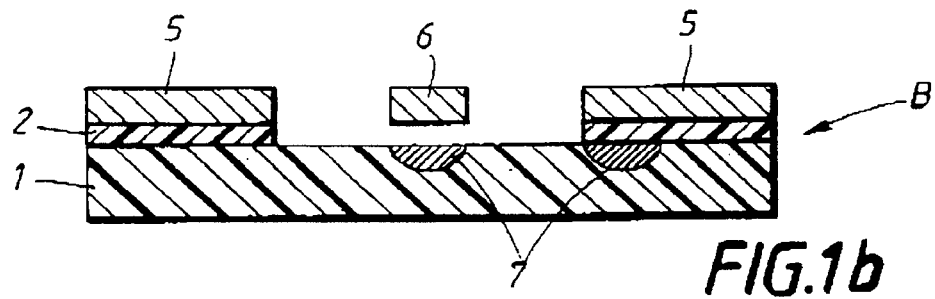

In FIG. 1 a device 10 is shown in form of a modulator comprising a buffer layer 2 arranged on a substrate 1, two optical wave guides 7, two ground electrodes 5 and a signal electrode 6 arranged between the two ground electrodes 5. In the illustrated embodiment the substrate is a so called LiNbO$_3$-substrate. In order to increase the group velocity of the electrical signal to match the velocity of the optical and the electrical signal the waveguiding structure shows in the direction of propagation a varying cross-section, in the embodiment shown in this figure two different cross-sections are alternating in the direction of propagation corresponding to a section A and a section B. Those cross-sections are more clearly shown in FIG. 1a which is a cross-sectional view taken along lines Ia—Ia of FIG. 1 and FIG. 1b which is cross-sectional view taken along lines Ib—Ib of FIG. 1. In the shown embodiment two sections differ from each other in that in one of them the buffer layer 2 is removed from the waveguide gap and under the signal electrode 6; particularly the material may have been removed through etching. Therethrough the capacitance per length unit of the electrical wave guide is reduced which makes the group velocity of the electrical signal increase. In FIG. 1 the different sections are denoted 1A and 1B to make it more clear how they alternate. In the shown embodiment the electrical field from the electrodes extending to the buffer layer 2 as well as into the optical wave guides 7, 7 and it is essential that the buffer layer 2 is removed or changed in a way which is variant in the direction of propagation which however can be achieved in a number of different ways. It is not necessary that the buffer layer 2 is removed or etched in such a way that it does not protrude for example outside ground electrodes 5, 5 but this is shown since it corresponds to a simple and practical embodiment. Furthermore, if the material in the buffer layer 2 is left under the signal electrode so that the structure under this is not varying in the direction of the propagation, the effect is reduced. To make the propagating electrical wave see the waveguide as "invariant" in the direction of propagation, particulary the lengths of the sections A and B should be considerably smaller than the wavelength of the highest frequency which is intended to be used in the modulator, i.e. for the modulating signal. Therethrough a gratinglike construction is obtained wherein the grating constant is to be smaller than 1/20 of the wavelength. In FIGS. 1a and 1b the cross-sections of section 1A and section 1B are more clearly shown. According to a preferred embodiment the buffer layers comprise SiO$_2$, but also other materials are possible such as for example SiO, a combination of SiO—SiO$_2$, Si or ITO. Appropriate values of the thicknesses of the electrodes 5, 6 and the buffer layer 2 can be around approximately 4–10 μm for the electrode(s) and for example 0,25 μm to 1,0 μm for the buffer layer 2, but these are merely examples of thicknesses.

Figure 2:
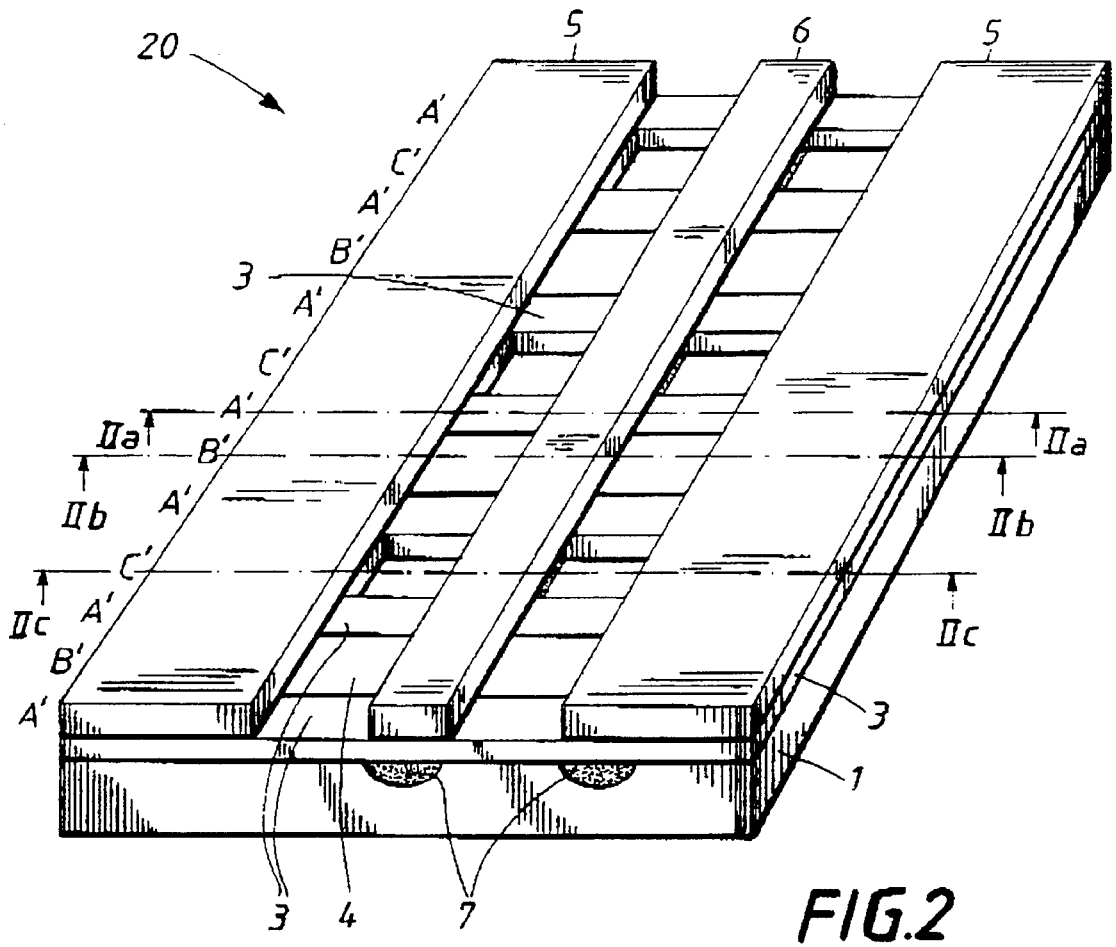
FIG. 2a is a cross-sectional view taken along lines IIa—IIa of FIG. 2 illustrating a first section.
FIG. 2b is a cross-sectional view taken along lines IIb—IIb of FIG. 2 illustrating a second section.
FIG. 2c is a cross-sectional view taken along lines IIc—IIc of FIG. 2 illustrating a third section, FIG. 3 schematically illustrates a wave guiding structure with random variation of different sections.
Figure 2A:
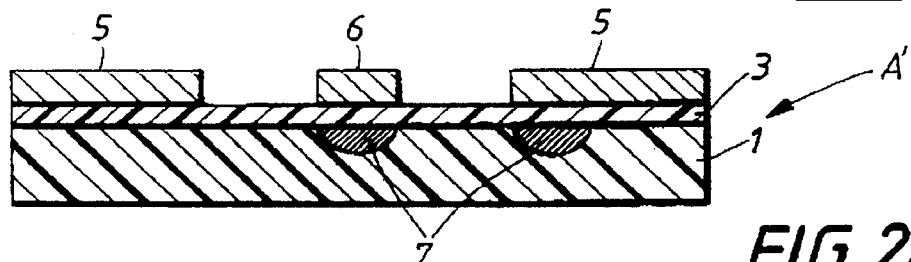
Figure 2B:
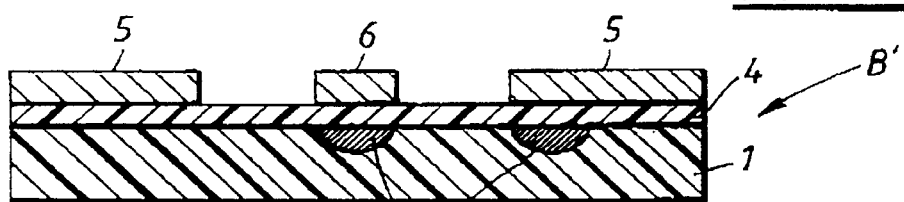
Figure 2C:
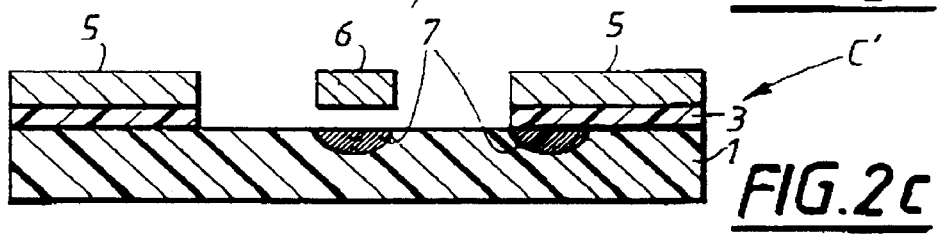

According to an alternative embodiment, illustrated in FIG. 2, the device 20 comprises, also here particularly in the form of a modulator, similar to the preceding embodiment two ground electrodes 5, a signal electrode 6 and a substrate 1, particularly LiNbO$_3$ or any other electro-optical material. In this device 20 however two different buffer layers 3, 4 are used. In this device 20 there are thus three different cross-sections A', B', C' which are more clearly shown in FIGS. 2a–2c which comprise cross-sectional views taken along lines IIa—IIa, IIb—IIb and IIc—IIc of FIG. 2. In FIG. 2 there are no buffer layer material in the section denoted C' in the figure. The different sections A', B', C' alternate in the way shown in FIG. 2. It is of course possible that different buffer layers alternate in other ways as well as it is possible to use more layers and so on. Also in the embodiment illustrated in FIG. 2 one of the sections (C') the buffer layer is etched away in the wave guiding gap and under the signal electrode 6 under which the field strength is as highest. Thereby material can be removed either from the buffer layer 3 or the buffer layer 4, only one example being illustrated in FIG. 2c, namely that remaining material is formed by buffer layer 3; it is also possible to have a further layer from which material could be removed by etching.

Figure 3:
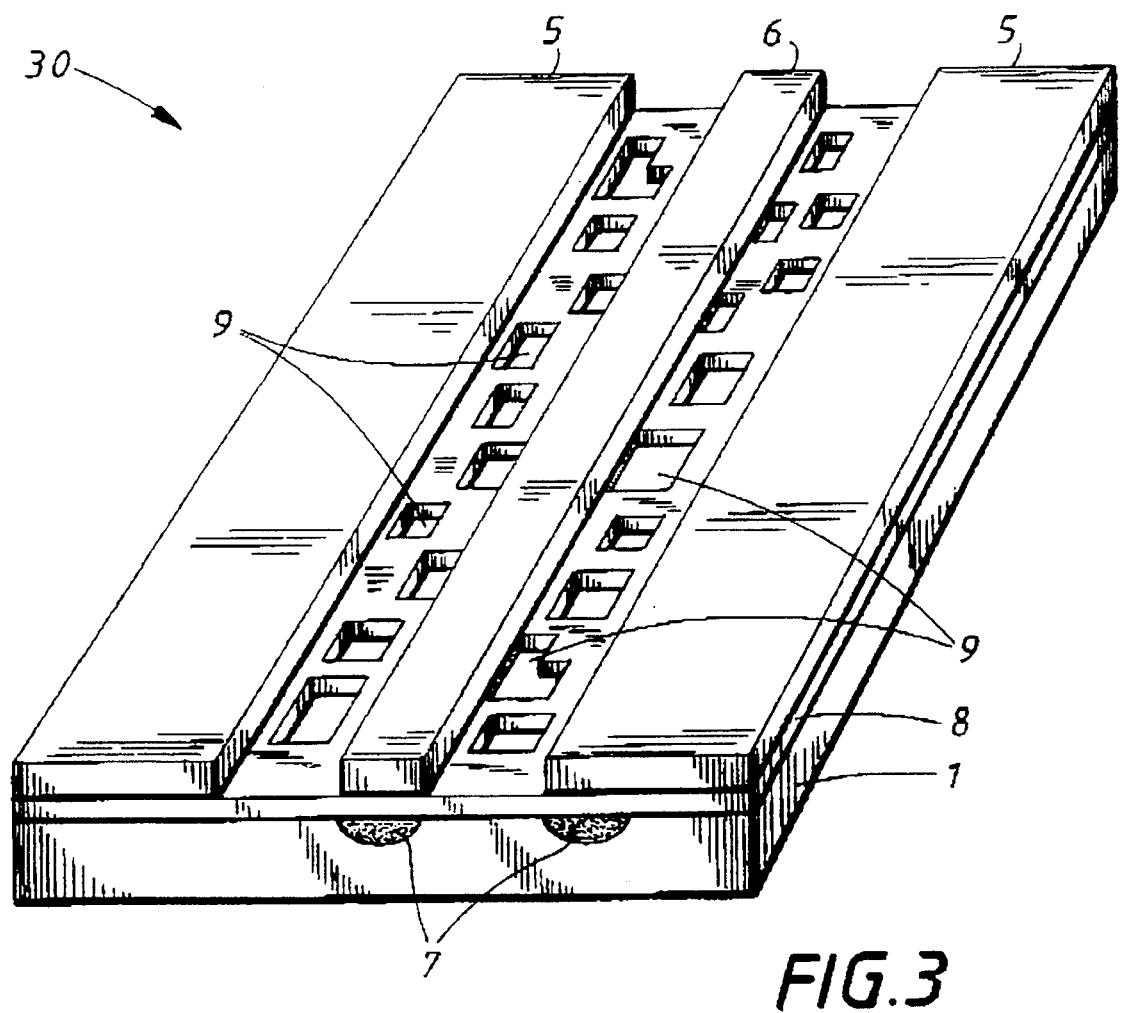

In the embodiment shown in FIG. 3 does not the waveguide structure 30 form a periodical grating but herein instead hollows or cavities 9 are randomly created by etching in the buffer layer 8. The cavities 9 or the hollows can vary in form and shape. In this embodiment as well as the others the material removed from the buffer layer 2, 3, 4, 8 does not have to be replaced by air but may be replaced with any other material under condition that this material has a dielectric constant which is smaller than the one of the material in buffer layer.

In all embodiments the electrode-structure can be different, it is e.g. not necessary with double ground planes. Furthermore it is possible to use an electrode structure which is not coplanar which however gives a very good result particularly with a substrate of LiNbO$_3$. It is also possible with alternatives where e.g. two signal electrodes and two ground planes are used, so called DCPW (Double Coplanar Waveguide) etc. It is furthermore not necessary to arrange a periodical grating in the area where the electrode has its electric field even if this is advantageous and for a number of practical reasons convenient to use a grating structure.

According to a mathematical model based on quasistationary TEM-modes (for the electrical mode only for isotropic materials) a number of parameters can be calculated such Z Characteristic impedance [Ω]

√ε$_r$ Microwave index []

α Microwave losses [m$^{-1}$f$^{-0,5}$]

γ Parameter of overlap [dm$^{-1}$V$^{-1}$]

Index 1 and 2 respectively relate to section A and B respectively, c is the velocity of light, n represents refractive index. Since the microwave losses are dominated by waveguide losses these are not influenced by a change in the dielectrica around the waveguide while one and the same lossparameter is obtained all over the structure. According to the model this reaches about 200 dB/m at 10 GHz.

The capacitance per length unit of section A and B and the capacitance C of a 50-ohm adapted grating electrode can be calculated via TEM-analysis.

$$C_1 = \frac{\sqrt{\epsilon_{r1}}}{cZ_1} \qquad C_2 = \frac{\sqrt{\epsilon_{r2}}}{cZ_2}$$

$$C_0 = \frac{\sqrt{\epsilon_{r1}} \sqrt{\epsilon_{r2}}}{c^2 Z_0^2 \sqrt{C_1} \sqrt{C_2}} \qquad Z_0 = 50\Omega$$

Therefrom the partial distances $L_1$ and $L_2$ as well as the other parameters of the grating electrode are obtained.

$$C_0 = L_1 C_1 + L_2 C_2 \qquad L_2 = 1 - L_1$$

$$\begin{cases} \sqrt{\epsilon_{r0}} &= L_1 \sqrt{\epsilon_{r1}} + L_2 \sqrt{\epsilon_{r2}} \\ \gamma_0 &= L_1 \gamma_1 + L_2 \gamma_2 \\ \alpha_0 &= L_1 \alpha_1 + L_2 \alpha_2 \end{cases}$$

$$Z_0 = 50\Omega$$

$\alpha_0 = \alpha_1 = \alpha_2 = 200$ dB/m at 10 GHz

The band width is then obtained from the response curve R (f), the switching voltage is obtained from the formula for $V_\pi$ and the V/GHz-quotient as $V_\pi$/the bandwidth.

$$R(f) = \frac{\sqrt{e^{-2\alpha L} - 2e^{-\alpha L} \cos(\beta L) + 1}}{L \sqrt{\alpha^2 + \beta^2}}$$

$$V_\pi = \frac{\pi}{10 \gamma_0 L}$$

$$\alpha = \alpha_0 \sqrt{f}$$

$$\beta = \frac{2\pi f (\sqrt{\epsilon_{r0}} - n_0)}{c}$$

$L = 0,01$ $n_0 = 2,2$

In the following are illustrated in table form values of the so called V/GHz-quotient for so called CPW-electrodes by use of three different thicknesses of the buffer layer, namely 0,25 μm, 0,5 μm and 1,0 μm and an electrode thickness of 4,0 μm.

These values are however merely a examples of embodiments. Table I corresponds to a buffer layer thickness of 0,25 μm, Table II corresponds to a buffer layer thickness of 0,5 μm whereas Table III corresponds to a buffer layer thickness of 1,0 μm. In all cases the electrode thickness is about 4,0 μm.

TABLE I

| W-G-W | $Z_1$ | $\sqrt{\epsilon}$ | $\gamma_1$ | $Z_2$ | $\sqrt{\epsilon_1}$ | $\gamma_2$ | $Z_0$ | $\sqrt{\epsilon_0}$ | $\gamma_0$ | $L_1$ | $L_2$ | $V_{cm}$ | GHzcm | V/GHz |
|---|---|---|---|---|---|---|---|---|---|---|---|---|---|---|
| 25-8-25 | 49,1 | 3,32 | 4,36 | 6,87 | 2,77 | 3,03 | 50,0 | 3,25 | 4,19 | 0,87 | 0,13 | 7,49 | 10,5 | 0,71 |
| 25-9-25 | 48,0 | 3,34 | 4,39 | 57,1 | 2,81 | 3,12 | 50,0 | 3,30 | 4,05 | 0,73 | 0,27 | 7,75 | 11,0 | 0,70 |
| 25-10-25 | 46,8 | 3,36 | 4,39 | 55,4 | 2,84 | 3,18 | 50,0 | 3,14 | 3,87 | 0,57 | 0,43 | 8,12 | 11,5 | 0,71 |
| 25-11-23 | 45,8 | 3,38 | 4,37 | 54,0 | 2,87 | 3,23 | 50,0 | 3,09 | 3,72 | 0,43 | 0,57 | 8,45 | 12,1 | 0,70 |
| 25-12-25 | 44,3 | 3,35 | 4,34 | 52,0 | 2,86 | 3,26 | 50,0 | 2,96 | 3,49 | 0,21 | 0,79 | 9,00 | 13,9 | 0,65 |
| *25-7-25 | | | | | | | 50,3 | 3,28 | 4,27 | — | — | 7,36 | 10,2 | 0,72 |

*Traditional design

TABLE II

| W-G-W | $Z_1$ | $V_\epsilon$ | $\gamma_1$ | $Z_2$ | $\sqrt{\epsilon_1}$ | $\gamma_2$ | $Z_0$ | $\sqrt{\epsilon_0}$ | $\gamma_0$ | $L_1$ | $L_2$ | $V_{cm}$ | GHzcm | V/GHz |
|---|---|---|---|---|---|---|---|---|---|---|---|---|---|---|
| 25-12-25 | 48,5 | 3,08 | 3,70 | 60,7 | 2,46 | 2,37 | 50,0 | 2,98 | 3,48 | 0,84 | 0,16 | 9,02 | 13,6 | 0,66 |
| 25-14-25 | 46,7 | 3,11 | 3,66 | 57,9 | 2,50 | 2,43 | 50,0 | 2,88 | 3,21 | 0,63 | 0,37 | 9,80 | 15,4 | 0,64 |
| 25-16-25 | 45,0 | 3,13 | 3,60 | 55,5 | 2,54 | 2,46 | 50,0 | 2,80 | 2,97 | 0,45 | 0,55 | 10,58 | 17,1 | 0,62 |
| 25-18-25 | 43,7 | 3,16 | 3,52 | 53,5 | 2,58 | 2,48 | 50,0 | 2,75 | 2,78 | 0,29 | 0,71 | 11,29 | 18,4 | 0,61 |
| 25-20-25 | 42,3 | 3,17 | 3,44 | 51,5 | 2,60 | 2,48 | 50,0 | 2,67 | 2,60 | 0,13 | 0,87 | 12,07 | 21,0 | 0,57 |
| *25-11-25 | | | | | | | 49,6 | 3,06 | 3,69 | — | — | 8,51 | 12,5 | 0,68 |

*Traditional design

TABLE III

| W-G-W | $Z_1$ | $V_\epsilon$ | $\gamma_1$ | $Z_2$ | $\sqrt{\epsilon_1}$ | $\gamma_2$ | $Z_0$ | $\sqrt{\epsilon_0}$ | $\gamma_0$ | $L_1$ | $L_2$ | $V_{cm}$ | GHzcm | V/GHz |
|---|---|---|---|---|---|---|---|---|---|---|---|---|---|---|
| 25-16-25 | 48,9 | 2,87 | 2,86 | 63,9 | 2,20 | 1,65 | 50,0 | 2,80 | 2,74 | 0,90 | 0,10 | 11,48 | 17,1 | 0,67 |
| 25-18-25 | 47,3 | 2,89 | 2,83 | 61,3 | 2,23 | 1,68 | 50,0 | 2,72 | 2,53 | 0,74 | 0,26 | 12,41 | 19,3 | 0,64 |
| 25-20-25 | 45,9 | 2,92 | 2,79 | 59,0 | 2,27 | 1,70 | 50,0 | 2,66 | 2,36 | 0,60 | 0,40 | 13,34 | 21,4 | 0,62 |
| 25-22-25 | 44,7 | 2,95 | 2,74 | 57,3 | 2,30 | 1,72 | 50,0 | 2,62 | 2,22 | 0,49 | 0,51 | 14,17 | 23,1 | 0,61 |
| 25-24-25 | 43,4 | 2,96 | 2,70 | 55,3 | 2,32 | 1,72 | 50,0 | 2,55 | 2,07 | 0,36 | 0,64 | 15,17 | 26,7 | 0,57 |
| 25-26-25 | 42,4 | 2,98 | 2,65 | 53,7 | 2,35 | 1,73 | 50,0 | 2,51 | 1,96 | 0,35 | 0,75 | 15,99 | 29,4 | 0,54 |
| 25-28-25 | 41,4 | 3,00 | 2,60 | 52,3 | 2,38 | 1,75 | 50,0 | 2,48 | 1,88 | 0,16 | 0,84 | 16,69 | 31,8 | 0,52 |
| *25-15-25 | | | | | | | 49,8 | 2,86 | 2,87 | — | — | 10,96 | 15,7 | 0,70 |

*Traditional design

As can be seen from the tables the V/GHz-quotient is lowered in all cases.

Thus the bandwidth in integrated optical modulators as well as other electro-optical devices can be increased by a device as described by the invention. Even if the feeding voltage per length unit somewhat increases, the gain in bandwidth will be significantly larger than the loss obtained from the increased feeding voltage. According to one embodiment the V/GHz-quotient can be reduced by about 25% at a thickness of the buffer layer of about 1 μm. Material above buffer layer can e.g. be removed by etching of and if it relates to a grating, according to a preferred embodiment, the grating constant of a grating may be about 300 μm which is easy to achieve since it it question about etching a hollow or a cavity of about 1 μm.

The invention shall of course not be limited to shown embodiments but may be varied freely within the scope of the claims. Buffer material (or bulk material) can of course be removed or be replaced in different ways as well as the variation in cross-section can be periodical or random, different number of buffer layers of a number of materials can be used and different thicknesses can be chosen for buffer layers as well as for electrodes etc. Of course the device does not have to form a modulator, a number of other devices of different kinds also being possible.

I claim:

1. A device for velocity matching between optical and electrical signals in a waveguide structure comprising first waveguiding means for optical signals and second waveguiding means for electrical signals, wherein the cross-section of the waveguide structure periodically varies dielectrically in the direction of propagation, and the variation in the cross-section comprises a periodical grating, the grating constant being significantly smaller than the wavelength of the electrical signal.

2. A device for velocity matching between optical and electrical signals in a waveguide structure comprising first waveguiding means for optical signals, second waveguiding means for electrical signals, and a buffer layer arranged between the first and second waveguiding means, wherein the cross-section of the waveguide structure varies in the direction of propagation, and the variation in cross-section is obtained by replacing material in the buffer layer by a different material having a lower dielectric constant or through removing material from the buffer layer.

3. A device as in claim 2 wherein the variation in cross-section is obtained through removing material by etching from the buffer layer in a gap between the waveguiding means and under a signal electrode.

4. A device for velocity matching between optical and electrical signals in a waveguide structure comprising first waveguiding means for optical signals, second waveguiding means for electrical signals, and a buffer layer arranged between the first and second waveguiding means, wherein the cross-section of the waveguide structure varies in the direction of propagation, the variation in cross-section is obtained by removing material from the buffer layer, and the waveguide structure has a first cross-section in which the buffer layer is removed under a signal electrode of the second waveguiding means and a second cross-section in which the buffer layer remains under the signal electrode of the second waveguiding means.

\* \* \* \* \*

UNITED STATES PATENT AND TRADEMARK OFFICE
CERTIFICATE OF CORRECTION

PATENT NO. : 5,619,607
DATED : April 8, 1997
INVENTOR(S) : Djupsjobaka

It is certified that error appears in the above-indentified patent and that said Letters Patent is hereby corrected as shown below:

On the Title Page:

In Section [54] Please delete "WAVE GUIDE" and insert therefor --WAVEGUIDE--;

in Section [56] References Cited, FOREIGN PATENT DOCUMENTS, please delete entry "152996 8/1985 European Pat. Off" (see duplicate entry directly below);

in Section [56] References Cited, OTHER PUBLICATIONS, please insert --M. Sangi et al., "Quasi-Matched-Velocity Traveling-Wave-Type Electrons for Light Modulators and Their Analysis", Electronics and Communications in Japan, part 2, vol. 70, no. 8, pp. 80-86.--; and in Section [56] References Cited, OTHER PUBLICATIONS (page 2), please delete duplicate entry "Velocity-Matching Tech. for Integrated Optic Traveling Wave Switch/Modulators" By Alferness et al., IEEE J. of Quantum Electronics vol. QE-20, No. 3 pp. 301-309, 1984" (entry duplicated on cover page, "R.C. Alferness et al...").

UNITED STATES PATENT AND TRADEMARK OFFICE
CERTIFICATE OF CORRECTION

PATENT NO. : 5,619,607
DATED : April 8, 1997
INVENTOR(S) : Djupsjobacka

It is certified that error appears in the above-indentified patent and that said Letters Patent is hereby corrected as shown below:

Column 1, line 62, before "particularly" please insert --occurs--.

Signed and Sealed this

First Day of July, 1997

Attest:

BRUCE LEHMAN

Attesting Officer

Commissioner of Patents and Trademarks